No. 855,290. PATENTED MAY 28, 1907.
W. A. DUFFIELD.
LINK.
APPLICATION FILED FEB. 26, 1907.
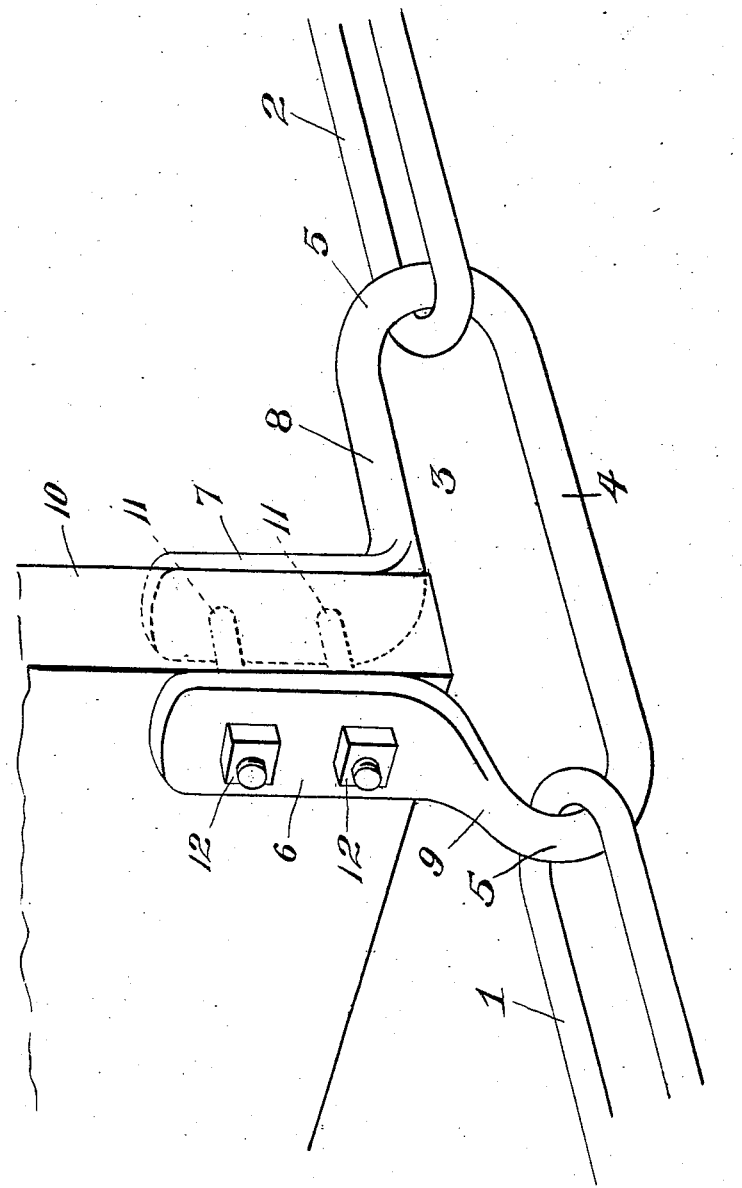
Witnesses
J. T. L. Wright,
Inventor
William A. Duffield,
By Victor J. Evans
Attorney

UNITED STATES PATENT OFFICE.

WILLIAM A. DUFFIELD, OF HARTRANFT, TENNESSEE.

LINK.

No. 855,290.　　Specification of Letters Patent.　　Patented May 28, 1907.

Application filed February 26, 1907. Serial No. 359,327.

*To all whom it may concern:*

Be it known that I, WILLIAM A. DUFFIELD, a citizen of the United States of America, residing at Hartranft, in the county of Claiborne and State of Tennessee, have invented new and useful Improvements in Links, of which the following is a specification.

This invention relates to links, more especially adapted for use in connecting the links of a chain adapted for carrying paddles for propelling boats, but capable of other uses, and one of the principal objects of the same is to provide a link which can be quickly connected to the links of an ordinary chain, and which will provide means for the attachment of a paddle for propelling boats or a conveyer flight.

Another object of the invention is to provide a link of simple construction, which can be quickly attached and detached to connect a new link in case of breakage of the chain, and in which the arms to which the paddle is secured, are located near the forward end of the link in order to secure greater strength, owing to the short arm of the link at the end at which the paddle is connected.

These and other objects may be attained by means of the construction illustrated in the accompanying drawing in which the figure is a perspective view, showing a link made in accordance with my invention and connected to links of an ordinary chain.

Referring to the drawing for a more particular description of my invention, the numeral 1 designates a link of an ordinary chain, and 2 is another link of said chain, said links being connected together by a link 3 made in accordance with my invention, and comprising a longitudinal bar 4, curved end portions 5, and angularly bent arms 6 and 7, said arms being bent at right angles to the longitudinal bar 8, and disposed at one side of the center of the link, the arm 6 being bent upward from the member 9 near the curved portion 5, while the arm 7 is bent upward from the member 8 at some distance from that end of the link. The arms 6 and 7 are spaced apart a sufficient distance to receive a paddle or conveyer flight 10, shown in dotted lines in the figure, and bolts 11 pass through the arms 6 and 7, and through the paddle or flight 10, and are fitted with nuts 12 for securing the arms properly on opposite sides of the paddle or flight 10.

From the foregoing it will be obvious that when one of the links of the chain breaks, it may be connected to the link 3, after it has been welded, or a new link may be connected to the link 3 by removing the bolts 11 and connecting the said link with either end of said link 3. It will also be understood, that owing to the location of the arm 6 relatively to the arm 9, that the paddle or flight 10 is held rigidly against the draft, which result would not be obtained were the arms 6 and 7 located centrally to the link.

My connecting link is comparatively simple in construction, can be produced at slight cost, is reliable and efficient in use, and broken links may be quickly connected thereto.

Having thus described my invention, what I claim is:

A connecting link comprising a longitudinal bar, curved end portions, a member parallel to the longitudinal bar extending from one end of the link and provided with an angular flattened arm, a similar arm extending from near the curved opposite end portion of the link, and bolts passing through said arms for holding a paddle or conveyer flight between them.

In testimony whereof, I affix my signature in presence of two witnesses.

WILLIAM A. DUFFIELD.

Witnesses:
　S. R. DAVIS,
　JAMES NORVELL.